(12) United States Patent
Kontomaris

(10) Patent No.: US 9,003,797 B2
(45) Date of Patent: *Apr. 14, 2015

(54) USE OF COMPOSITIONS COMPRISING 1,1,1,2,3-PENTAFLUOROPROPANE AND OPTIONALLY Z-1,1,1,4,4,4-HEXAFLUORO-2-BUTENE IN POWER CYCLES

(71) Applicant: E I du Pont de Nemours and Company, Wilmington, DE (US)

(72) Inventor: Konstantinos Kontomaris, Wilmington, DE (US)

(73) Assignee: E l du Pont de Nemours and Company, Wilmington, DE (US)

( * ) Notice: Subject to any disclaimer, the term of this patent is extended or adjusted under 35 U.S.C. 154(b) by 113 days.

This patent is subject to a terminal disclaimer.

(21) Appl. No.: 13/666,463

(22) Filed: Nov. 1, 2012

(65) Prior Publication Data

US 2013/0104548 A1    May 2, 2013

Related U.S. Application Data

(60) Provisional application No. 61/554,791, filed on Nov. 2, 2011.

(51) Int. Cl.
*C09K 5/00* (2006.01)
*F01K 25/08* (2006.01)
*C09K 5/04* (2006.01)

(52) U.S. Cl.
CPC ........... *C09K 5/048* (2013.01); *C09K 2205/126* (2013.01); *C09K 2205/22* (2013.01)

(58) Field of Classification Search
USPC ............... 252/67–71, 73, 77; 60/645–681
See application file for complete search history.

(56) References Cited

U.S. PATENT DOCUMENTS

| 4,142,108 A | 2/1979 | Matthews |
| 5,396,000 A | 3/1995 | Nappa et al. |

(Continued)

FOREIGN PATENT DOCUMENTS

| WO | 98/06791 A1 | 2/1998 |
| WO | 2009/114398 A1 | 9/2009 |
| WO | 2012/106565 A1 | 8/2012 |

OTHER PUBLICATIONS

Doherty, M. F., et al., Conceptual Design of Distillation Systems, McGraw-Hill (New York), 2001, pp. 185-186, 351-359.
Musthafah B. Mohd. Tahir, Noboru Yamada, and Tetsuya Hoshino, Efficiency of Compact Organic Rankine Cycle System with Rotary-Vane-Type Expander for Low-Temperature Waste Heat Recovery, International Journal of Civil and Environmental Engineering 2:1, 2010, pp. 11-16.

(Continued)

*Primary Examiner* — Hoang Nguyen

(57) ABSTRACT

A method is provided for converting heat from a heat source to mechanical energy. The method comprises heating a working fluid using heat supplied from the heat source; and expanding the heated working fluid to lower the pressure of the working fluid and generate mechanical energy as the pressure of the working fluid is lowered. The method is characterized by using a working fluid comprising HFC-245eb and optionally Z-HFO-1336mzz. A power cycle apparatus containing a working fluid to convert heat to mechanical energy is also provided. The apparatus is characterized by containing a working fluid comprising HFC-245eb and optionally Z-HFO-1336mzz. A working fluid comprising HFC-245eb and optionally Z-HFO-1336mzz is also provided. The working fluid (i) further comprises E-HFO-1336mzz, (ii) has a temperature above its critical temperature, or both (i) and (ii).

14 Claims, 2 Drawing Sheets

(56) References Cited

U.S. PATENT DOCUMENTS

| | | |
|---|---|---|
| 7,428,816 B2 | 9/2008 | Singh et al. |
| 2006/0010872 A1* | 1/2006 | Singh et al. .................... 60/671 |
| 2009/0012335 A1 | 1/2009 | Nappa et al. |
| 2009/0264690 A1 | 10/2009 | Rao et al. |
| 2009/0305876 A1* | 12/2009 | Singh et al. .................. 502/150 |
| 2010/0104575 A1* | 4/2010 | Sooknanan et al. ....... 424/139.1 |
| 2010/0326095 A1* | 12/2010 | Van Horn et al. ................ 62/77 |
| 2011/0144216 A1 | 6/2011 | Hulse et al. |
| 2013/0104573 A1* | 5/2013 | Kontomaris ..................... 62/56 |

OTHER PUBLICATIONS

Adelina P. Davis, et al., Geothermal power production from abandoned oil wells, Energy 34, 2009, pp. 866-872, Elsevier Ltd.

Joost J. Brasz, et al., Power Production from a Moderate-Temperature Geothermal Resource, GRC Annual Meeting, Sep. 25-28, 2005; Reno, Nevada.

PCT International Application No. PCT/US12/51239 Filed Aug. 16, 2012.

PCT International Search Report and Written Opinion mailed Mar. 14, 2013.

* cited by examiner

USE OF COMPOSITIONS COMPRISING 1,1,1,2,3-PENTAFLUOROPROPANE AND OPTIONALLY Z-1,1,1,4,4,4-HEXAFLUORO-2-BUTENE IN POWER CYCLES

CROSS REFERENCE(S) TO RELATED APPLICATION(S)

This application claims the priority benefit of U.S. Provisional Patent Application No. 61/554,791, filed Nov. 2, 2011.

FIELD OF THE INVENTION

This invention relates to compositions for producing mechanical energy in power cycles, such as organic Rankine cycles.

BACKGROUND OF THE INVENTION

Low global warming potential working fluids are needed for power cycles such as organic Rankine cycles. Such materials must have low environmental impact, as measured by low global warming potential and low ozone depletion potential.

SUMMARY OF THE INVENTION

The present invention involves compositions comprising 1,1,1,2,3-pentafluoropropane (HFC-245eb) and optionally Z-1,1,1,4,4,4-hexafluoro-2-butene (Z-HFO-1336mzz).

Embodiments of the present invention involve the compound HFC-245eb, either alone or in combination with one or more other compounds as described in detail herein below.

In accordance with this invention, a method is provided for converting heat from a heat source to mechanical energy. The method comprises heating a working fluid using heat supplied from the heat source; and expanding the heated working fluid to lower the pressure of the working fluid and generate mechanical energy as the pressure of the working fluid is lowered. The method is characterized by using a working fluid comprising HFC-245eb and optionally Z-HFO-1336mzz.

In accordance with this invention, a power cycle apparatus containing a working fluid to convert heat to mechanical energy is provided. The apparatus is characterized by containing a working fluid comprising HFC-245eb and optionally Z-HFO-1336mzz.

In accordance with this invention, a working fluid comprising HFC-245eb and optionally Z-HFO-1336mzz is provided. The working fluid (i) further comprises E-HFO-1336mzz, or (ii) has a temperature above its critical temperature, or both (i) and (ii).

Also in accordance with this invention, a method for raising the maximum feasible evaporating temperature of an existing Rankine cycle system containing a first working fluid is provided. The method comprises replacing the first working fluid with a second working fluid comprising HFC-245eb and optionally Z-HFO-1336mzz.

DETAILED DESCRIPTION OF PREFERRED EMBODIMENTS

Figure 1:
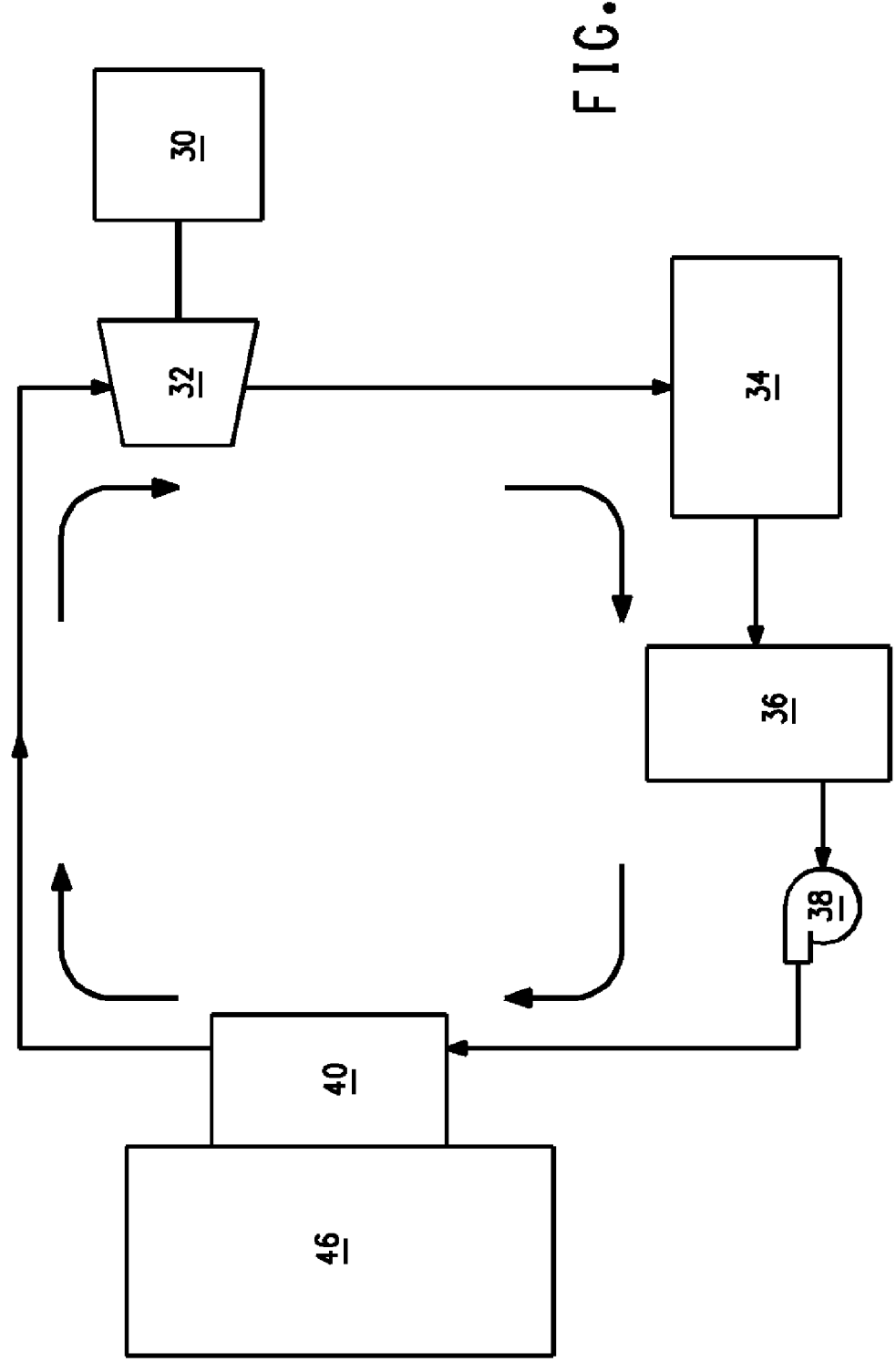
FIG. 1 is a block diagram of a heat source and an organic Rankine cycle system in direct heat exchange according to the present invention.

Before addressing details of embodiments described below, some terms are defined or clarified.

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100 year time horizon is commonly the value referenced.

Net cycle power output is the rate of mechanical work generation at an expander (e.g., a turbine) less the rate of mechanical work consumed by a compressor (e.g., a liquid pump).

Volumetric capacity for power generation is the net cycle power output per unit volume of working fluid (as measured at the conditions at the expander outlet) circulated through the power cycle (e.g., organic Rankine cycle).

Cycle efficiency (also referred to as thermal efficiency) is the net cycle power output divided by the rate at which heat is received by the working fluid during the heating stage of a power cycle (e.g., organic Rankine cycle).

Subcooling is the reduction of the temperature of a liquid below that liquid's saturation point for a given pressure. The saturation point is the temperature at which a vapor composition is completely condensed to a liquid (also referred to as the bubble point). But subcooling continues to cool the liquid to a lower temperature liquid at the given pressure. Subcool amount is the amount of cooling below the saturation temperature (in degrees) or how far below its saturation temperature a liquid composition is cooled.

Superheat is a term that defines how far above the saturation vapor temperature of a vapor composition a vapor composition is heated. Saturation vapor temperature is the temperature at which, if a vapor composition is cooled, the first drop of liquid is formed, also referred to as the "dew point".

An azeotropic composition is a mixture of two or more different components which, when in liquid form under a given pressure, will boil at a substantially constant temperature, which temperature may be higher or lower than the boiling temperatures of the individual components, and which will provide a vapor composition essentially identical to the overall liquid composition undergoing boiling. (see, e.g., M. F. Doherty and M. F. Malone, Conceptual Design of Distillation Systems, McGraw-Hill (New York), 2001, 185-186, 351-359).

Accordingly, the essential features of an azeotropic composition are that at a given pressure, the boiling point of the liquid composition is fixed and that the composition of the vapor above the boiling composition is essentially that of the overall boiling liquid composition (i.e., no fractionation of the components of the liquid composition takes place). It is also recognized in the art that both the boiling point and the weight percentages of each component of the azeotropic composition may change when the azeotropic composition is subjected to boiling at different pressures. Thus, an azeotropic composition may be defined in terms of the unique relationship that exists among the components or in terms of the compositional ranges of the components or in terms of exact weight percentages of each component of the composition characterized by a fixed boiling point at a specified pressure.

For the purpose of this invention, an azeotrope-like composition means a composition that behaves substantially like an azeotropic composition (i.e., has constant boiling characteristics or a tendency not to fractionate upon boiling or evaporation). Hence, during boiling or evaporation, the vapor and liquid compositions, if they change at all, change only to a minimal or negligible extent. This is to be contrasted with non-azeotrope-like compositions in which during boiling or evaporation, the vapor and liquid compositions change to a substantial degree.

As used herein, the terms "comprises," "comprising," "includes," "including," "has," "having" or any other variation thereof, are intended to cover a non-exclusive inclusion. For example, a composition, process, method, article, or apparatus that comprises a list of elements is not necessarily limited to only those elements but may include other elements not expressly listed or inherent to such composition, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" is used to define a composition, method or apparatus that includes materials, steps, features, components, or elements, in addition to those literally disclosed provided that these additional included materials, steps, features, components, or elements do materially affect the basic and novel characteristic(s) of the claimed invention. The term 'consisting essentially of' occupies a middle ground between "comprising" and 'consisting of'.

Where applicants have defined an invention or a portion thereof with an open-ended term such as "comprising," it should be readily understood that (unless otherwise stated) the description should be interpreted to also describe such an invention using the terms "consisting essentially of" or "consisting of."

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

HFC-245eb, or 1,1,1,2,3-pentafluoropropane ($CF_3CHFCH_2F$), can be prepared by the hydrogenation of 1,1,1,2,3-pentafluoro-2,3,3-trichloropropane ($CF_3CClFCCl_2F$ or CFC-215bb) over a palladium on carbon catalyst as disclosed in U.S. Patent Publication No. 2009-0264690 A1, incorporated herein in its entirety, or by hydrogenation of 1,2,3,3,3-pentafluoropropene ($CF_3CF=CFH$ or HFO-1225ye) as disclosed in U.S. Pat. No. 5,396,000, incorporated herein by reference.

Z-1,1,1,4,4,4-hexafluoro-2-butene (also known as Z-HFO-1336mzz or cis-HFO-1336mzz and having the structure cis-$CF_3CH=CHCF_3$), may be made by methods known in the art, such as by hydrodechlorination of 2,3-dichloro-1,1,1,4,4,4-hexafluoro-2-butene, as described in U.S. Patent Application Publication No. US 2009/0012335 A1, incorporated herein by reference.

Power Cycle Methods

A sub-critical organic Rankine cycle (ORC) is defined as a Rankine cycle in which an organic working fluid used in the cycle receives heat at a pressure lower than the critical pressure of the organic working fluid and the working fluid remains below its critical pressure throughout the entire cycle.

A trans-critical ORC is defined as a Rankine cycle in which an organic working fluid used in the cycle receives heat at a pressure higher than the critical pressure of the organic working fluid. In a trans-critical cycle, the working fluid is not at a pressure higher than its critical pressure throughout the entire cycle.

A super-critical power cycle is defined as a power cycle which operates at pressures higher than the critical pressure of an organic working fluid used in the cycle and involves the following steps: compression; heating; expansion; cooling.

A method for converting heat from a heat source to mechanical energy is provided. The method comprises: heating a working fluid comprising HFC-245eb and optionally Z-HFO-1336mzz using heat supplied from the heat source; and expanding the heated working fluid to lower pressure of the working fluid and generate mechanical energy as the pressure of the working fluid is lowered.

The method of this invention is typically used in an organic Rankine power cycle. Heat available at relatively low temperatures compared to steam (inorganic) power cycles can be used to generate mechanical power through Rankine cycles using working fluids comprising HFC-245eb and optionally Z-HFO-1336mzz. In the method of this invention, working fluid comprising HFC-245eb and optionally Z-HFO-1336mzz is compressed prior to being heated. Compression may be provided by a pump which pumps working fluid to a heat transfer unit (e.g., a heat exchanger or an evaporator) where heat from the heat source is used to heat the working fluid. The heated working fluid is then expanded, lowering its pressure. Mechanical energy is generated during the working fluid expansion using an expander. Examples of expanders include turbo or dynamic expanders, such as turbines, and positive displacement expanders, such as screw expanders, scroll expanders, and piston expanders. Examples of expanders also include rotary vane expanders (Musthafah b. Mohd. Tahir, Noboru Yamada, and Tetsuya Hoshino, International Journal of Civil and Environmental Engineering 2:1 2010).

Mechanical power can be used directly (e.g. to drive a compressor) or be converted to electrical power through the use of electrical power generators. In a power cycle where the working fluid is re-used, the expanded working fluid is cooled. Cooling may be accomplished in a working fluid cooling unit (e.g. a heat exchanger or a condenser). The cooled working fluid can then be used for repeated cycles (i.e., compression, heating, expansion, etc.). The same pump used for compression may be used for transferring the working fluid from the cooling stage.

Of note are methods for converting heat from a heat source to mechanical energy wherein the working fluid consists essentially of HFC-245eb and optionally Z-HFO-1336mzz. Also of note are methods for converting heat from a heat source to mechanical energy wherein the working fluid consists essentially of HFC-245eb. Also of note are methods for converting heat from a heat source to mechanical energy wherein the working fluid consists essentially of HFC-245eb and Z-HFO-1336mzz. Of particular note are azeotropic and azeotrope-like working fluids consisting essentially of HFC-245eb and Z-HFO-1336mzz. Also of note are methods for converting heat from a heat source to mechanical energy wherein the working fluid consists of HFC-245eb.

While neat HFC-245eb may meet the need for a power cycle working fluid, it can be improved by the addition of a component such as Z-HFO-1336mzz. Addition of Z-HFO-1336mzz to HFC-245eb gives the advantage of reducing the pressure of the working fluid and of reducing the GWP.

In another embodiment, non-flammable compositions are desirable for use in power cycles. Of note are non-flammable compositions comprising at least 41 weight percent Z-HFO-1336mzz and no more than 59 weight percent HFC-245eb.

Additionally, in another embodiment, power cycles operated with Z-HFO-1336mzz/HFC-245eb blends containing about 71 weight percent or more Z-HFO-1336mzz will have vapor pressures below the threshold necessitating compliance with provisions of the ASME Boiler and Pressure Vessel Code. Such compositions are desirable for use in power cycles.

Further, in another embodiment, low GWP compositions are desirable. Of note are compositions comprising at least 49.5 weight percent Z-HFO-1336mzz and no more than 50.5 weight percent HFC-245eb, which have GWP less than 150.

In another embodiment, compositions useful in the methods for converting heat to mechanical energy may comprise from about 0 to 41 weight percent Z-HFO-1336mzz and from about 100 to 59 weight percent HFC-245eb. In another embodiment, the useful compositions consist essentially of from about 0 to 41 weight percent Z-HFO-1336mzz and from about 100 to 59 weight percent HFC-245eb. And in another embodiment, the useful compositions consist of from about 0 to 41 weight percent Z-HFO-1336mzz and from about 100 to 59 weight percent HFC-245eb. This range of compositions provides higher energy efficiency and higher volumetric capacity for power generation (relative to compositions with higher Z-HFO-1336mzz content) while still offering good GWP values and sufficiently low vapor pressures (relative to 245fa) to keep equipment cost low.

In another embodiment, compositions useful in the methods for converting heat to mechanical energy may comprise from about 41 to 50 weight percent Z-HFO-1336mzz and from about 59 to 50 weight percent HFC-245eb. In another embodiment, the useful compositions consist essentially of from about 41 to 50 weight percent Z-HFO-1336mzz and from about 59 to 50 weight percent HFC-245eb. And in another embodiment, the useful compositions consist of from about 41 to 50 weight percent Z-HFO-1336mzz and from about 59 to 50 weight percent HFC-245eb. This range of compositions have the added advantage of non-flammability and even lower GWP values, including values lower than 150 (which minimizes the risk of restrictions by anticipated climate protection regulations) while still maintaining high energy efficiency, high volumetric capacity for power generation and low vapor pressure.

It should be noted that compositions containing more than about 50 weight percent Z-HFO-1336mzz have lower energy efficiency and lower volumetric capacity for power generation than would be desirable for such systems.

In one embodiment, the present invention relates to a method for converting heat from a heat source to mechanical energy using a sub-critical cycle. This method comprises the following steps:
 (a) compressing a liquid working fluid to a pressure below its critical pressure;
 (b) heating the compressed liquid working fluid from (a) using heat supplied by the heat source to form a vapor working fluid;
 (c) expanding the vapor working fluid from (b) to lower the pressure of the working fluid and generate mechanical energy;
 (d) cooling the expanded working fluid from (c) to form a cooled liquid working fluid; and
 (e) cycling the cooled liquid working fluid from (d) to (a) for compression.

Embodiments including use of one or more internal heat exchangers (e.g., a recuperator), and/or use of more than one cycle in a cascade system are intended to fall within the scope of the sub-critical ORC power cycles of the present invention.

In one embodiment, the present invention relates to a method for converting heat from a heat source to mechanical energy using a trans-critical cycle. This method comprises the following steps:
 (a) compressing a liquid working fluid above said working fluid's critical pressure;
 (b) heating the compressed working fluid from (a) using heat supplied by the heat source;
 (c) expanding the heated working fluid from (b) to lower the pressure of the working fluid below its critical pressure and generate mechanical energy;
 (d) cooling the expanded working fluid from (c) to form a cooled liquid working fluid; and
 (e) cycling the cooled liquid working fluid from (d) to (a) for compression.

In the first step of the trans-critical Organic Rankine Cycle (ORC) system, described above, the working fluid in liquid phase comprising HFC-245eb and optionally Z-HFO-1336mzz is compressed to above its critical pressure. In a second step, said working fluid is passed through a heat exchanger to be heated to a higher temperature before the fluid enters the expander wherein the heat exchanger is in thermal communication with said heat source. The heat exchanger receives heat energy from the heat source by any known means of thermal transfer. The ORC system working fluid circulates through the heat supply heat exchanger where the fluid gains heat.

In the next step, at least a portion of the heated working fluid is removed from the heat exchanger and is routed to the expander where the expansion process results in conversion of at least portion of the heat energy content of the working fluid into mechanical shaft energy. The shaft energy can be used to do any mechanical work by employing conventional arrangements of belts, pulleys, gears, transmissions or similar devices depending on the desired speed and torque required. In one embodiment, the shaft can also be connected to an electric power-generating device such as an induction generator. The electricity produced can be used locally or delivered to a regional grid. The pressure of the working fluid is reduced to below critical pressure of the working fluid, thereby producing vapor phase working fluid.

In the next step, the working fluid is passed from the expander to a condenser, wherein the vapor phase working fluid is condensed to produce liquid phase working fluid. The above steps form a loop system and can be repeated many times.

Embodiments including use of one or more internal heat exchangers (e.g., a recuperator), and/or use of more than one cycle in a cascade system are intended to fall within the scope of the trans-critical ORC power cycles of the present invention.

Additionally, for a trans-critical organic Rankine cycle, there are several different modes of operation.

In one mode of operation, in the first step of a trans-critical organic Rankine cycle, the working fluid is compressed above the critical pressure of the working fluid substantially isentropically. In the next step, the working fluid is heated under a constant pressure (isobaric) condition to above its critical temperature. In the next step, the working fluid is expanded substantially isentropically at a temperature that maintains the working fluid in the vapor phase. At the end of the expansion the working fluid is a superheated vapor at a temperature below its critical temperature. In the last step of this cycle, the working fluid is cooled and condensed while heat is rejected to a cooling medium. During this step the working fluid condensed to a liquid. The working fluid could be subcooled at the end of this cooling step.

In another mode of operation of a trans-critical ORC power cycle, in the first step, the working fluid is compressed above the critical pressure of the working fluid, substantially isentropically. In the next step the working fluid is then heated under a constant pressure condition to above its critical temperature, but only to such an extent that in the next step, when the working fluid is expanded substantially isentropically, and its temperature is reduced, the working fluid is sufficiently close to being a saturated vapor that partial condensation or misting of the working fluid may occur. At the end of this step, however, the working fluid is still a slightly superheated vapor. In the last step, the working fluid is cooled and condensed while heat is rejected to a cooling medium. During this step the working fluid condensed to a liquid. The working fluid could be subcooled at the end of this cooling/condensing step.

In another mode of operation of a trans-critical ORC power cycle, in the first step, the working fluid is compressed above the critical pressure of the working fluid, substantially isentropically. In the next step, the working fluid is heated under a constant pressure condition to a temperature either below or only slightly above its critical temperature. At this stage, the working fluid temperature is such that when the working fluid is expanded substantially isentropically in the next step, the working fluid is partially condensed. In the last step, the working fluid is cooled and fully condensed and heat is rejected to a cooling medium. The working fluid may be subcooled at the end of this step.

While the above embodiments for a trans-critical ORC cycle show substantially isentropic expansions and compressions, and isobaric heating or cooling, other cycles wherein such isentropic or isobaric conditions are not maintained but the cycle is nevertheless accomplished, is within the scope of the present invention.

In one embodiment, the present invention relates to a method for converting heat from a heat source to mechanical energy using a super-critical cycle. This method comprises the following steps:

(a) compressing a working fluid from a pressure above its critical pressure to a higher pressure;
(b) heating the compressed working fluid from (a) using heat supplied by the heat source;
(c) expanding the heated working fluid from (b) to lower the pressure of the working fluid to a pressure above its critical pressure and generate mechanical energy;
(d) cooling the expanded working fluid from (c) to form a cooled working fluid above its critical pressure; and
(e) cycling the cooled liquid working fluid from (d) to (a) for compression.

Embodiments including use of one or more internal heat exchangers (e.g., a recuperator), and/or use of more than one cycle in a cascade system are intended to fall within the scope of the super-critical ORC power cycles of the present invention.

Typically, in the case of sub-critical Rankine cycle operation, most heat supplied to the working fluid is supplied during evaporation of the working fluid. As a result the working fluid temperature is essentially constant during transfer of heat from the heat source to the working fluid. In contrast, working fluid temperature can vary when the fluid is heated isobarically without phase change at a pressure above its critical pressure. Accordingly, when the heat source temperature varies, use of a fluid above its critical pressure to extract heat from a heat source allows better matching between the heat source temperature and the working fluid temperature compared to the case of sub-critical heat extraction. As a result, efficiency of the heat exchange process in a super-critical cycle or a trans-critical cycle is often higher than that of the sub-critical cycle (see Chen, et al., Energy, 36, (2011) 549-555 and references therein).

The critical temperature and pressure of HFC-245eb are 165.6° C. and 3.06 MPa, respectively. The critical temperature and pressure of Z-HFO-1336mzz are about 171.3° C. and about 2.9 MPa, respectively. Use of HFC-245eb or mixtures thereof with Z-HFO-1336mzz as a working fluid can enable Rankine cycles that receive heat from heat sources with temperatures higher than the critical temperature thereof in a super-critical cycle or a trans-critical cycle. Higher temperature heat sources lead to higher cycle energy efficiencies and volumetric capacities for power generation (relative to lower temperature heat sources). When heat is received using a working fluid above its critical temperature, a fluid heater having a specified pressure and exit temperature (essentially equal to the expander inlet temperature) is used instead of the evaporator (or boiler) used in the conventional sub-critical Rankine cycle.

In one embodiment of the above methods, the efficiency of converting heat to mechanical energy (cycle efficiency) is at least about 2%. In a suitable embodiment, the efficiency (efficiency numbers) can be selected from the following:

about 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, and about 25%.

In another embodiment, the efficiency is selected from a range that has endpoints (inclusive) of any two efficiency numbers supra.

Typically for sub-critical cycles, the temperature to which the working fluid is heated using heat from the heat source is in the range of from about 50° C. to about 160° C., preferably from about 80° C. to about 160° C., more preferably from about 125° C. to 160° C. Typically for trans-critical and super-critical cycles, the temperature to which the working fluid is heated using heat from the heat source is in the range of from about 175° C. to about 400° C., preferably from about 175° C. to about 300° C., more preferably from about 185° C. to 250° C.

In a suitable embodiment, the temperature of operation at the expander inlet can be any one of the following temperatures or within the range (inclusive) defined by any two numbers below:

about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, and about 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 323, 323, 324, 325, 326, 327, 328, 329, 330, 331, 323, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400° C.

The pressure of the working fluid in the expander is reduced from the expander inlet pressure to the expander outlet pressure. Typical expander inlet pressures for super-critical cycles are within the range of from about 5 MPa to about 15 MPa, preferably from about 5 MPa to about 10 MPa, and more preferably from about 5 MPa to about 8 MPa. Typical expander outlet pressures for super-critical cycles are within 1 MPa above the critical pressure.

Typical expander inlet pressures for trans-critical cycles are within the range of from about the critical pressure to about 15 MPa, preferably from about the critical pressure to about 10 MPa, and more preferably from about the critical pressure to about 5 MPa. Typical expander outlet pressures for trans-critical cycles are within the range of from about 0.025 MPa to about 1.60 MPa, more typically from about 0.05 MPa to about 1.10 MPa, more typically from about 0.10 MPa to about 0.60 MPa.

Typical expander inlet pressures for sub-critical cycles are within the range of from about 0.25 MPa to about 0.1 MPa below the critical pressure, preferably from about 0.5 MPa to about 0.1 MPa below the critical pressure, and more preferably from about 1 MPa to about 0.1 MPa below the critical pressure. Typical expander outlet pressures for sub-critical cycles are within the range of from about 0.025 MPa to about 1.60 MPa, more typically from about 0.05 MPa to about 1.10 MPa, more typically from about 0.10 MPa to about 0.60 MPa.

The cost of a power cycle apparatus can increase when design for higher pressure is required. Accordingly, there is generally at least an initial cost advantage to limiting maximum cycle operating pressure. Of note are cycles where maximum operating pressure (typically present in the working fluid heater or evaporator and the expander inlet) does not exceed 2.2 MPa.

The novel working fluid of the present invention may be used in an ORC system to generate mechanical energy from heat extracted or received from relatively low temperature heat sources such as low pressure steam, industrial waste heat, solar energy, geothermal hot water, low-pressure geothermal steam (primary or secondary arrangements), or distributed power generation equipment utilizing fuel cells or prime movers such as turbines, microturbines, or internal combustion engines. One source of low-pressure steam could be the process known as a binary geothermal Rankine cycle. Large quantities of low-pressure steam can be found in numerous locations, such as in fossil fuel powered electrical generating power plants.

Other sources of heat include waste heat recovered from gases exhausted from mobile internal combustion engines (e.g. truck or rail diesel engines), waste heat from exhaust gases from stationary internal combustion engines (e.g. stationary diesel engine power generators), waste heat from fuel cells, heat available at combined heating, cooling and power or district heating and cooling plants, waste heat from biomass fueled engines, heat from natural gas or methane gas burners or methane-fired boilers or methane fuel cells (e.g. at distributed power generation facilities) operated with methane from various sources including biogas, landfill gas and coal-bed methane, heat from combustion of bark and lignin at paper/pulp mills, heat from incinerators, heat from low pressure steam at conventional steam power plants (to drive "bottoming" Rankine cycles), and geothermal heat.

In one embodiment of the Rankine cycles of this invention, geothermal heat is supplied to the working fluid circulating above ground (e.g. binary cycle geothermal power plants). In another embodiment of the Rankine cycles of this invention, a novel working fluid composition of this invention is used both as the Rankine cycle working fluid and as a geothermal heat carrier circulating underground in deep wells with the flow largely or exclusively driven by temperature-induced fluid density variations, known as "the thermosyphon effect" (e.g. see Davis, A. P. and E. E. Michaelides: "Geothermal power production from abandoned oil wells", Energy, 34 (2009) 866-872; Matthews, H. B. U.S. Pat. No. 4,142,108-Feb. 27, 1979)

Other sources of heat include solar heat from solar panel arrays including parabolic solar panel arrays, solar heat from concentrated solar power plants, heat removed from photovoltaic (PV) solar systems to cool the PV system to maintain a high PV system efficiency.

In other embodiments, the present invention also uses other types of ORC systems, for example, small scale (e.g. 1-500 kW, preferably 5-250 kW) Rankine cycle systems using micro-turbines or small size positive displacement expanders (e.g. Tahir, Yamada and Hoshino: "Efficiency of compact organic Rankine cycle system with rotary-vane-type expander for low-temperature waste heat recovery", Intl J. of Civil and Environ. Eng 2:1 2010), combined, multistage, and cascade Rankine Cycles, and Rankine Cycle systems with recuperators to recover heat from the vapor exiting the expander.

Other sources of heat include at least one operation associated with at least one industry selected from the group consisting of: oil refineries, petrochemical plants, oil and gas pipelines, chemical industry, commercial buildings, hotels, shopping malls, supermarkets, bakeries, food processing industries, restaurants, paint curing ovens, furniture making, plastics molders, cement kilns, lumber kilns, calcining operations, steel industry, glass industry, foundries, smelting, air-conditioning, refrigeration, and central heating.

In another embodiment, a method for raising the maximum feasible evaporating temperature of an existing Rankine cycle system containing a first working fluid is provided. The method comprises replacing the first working fluid with a second working fluid comprising HFC-245eb and optionally Z-HFO-1336mzz.

HFC-245eb and HFC-245eb/Z-HFO-1336mzz blends have lower evaporating pressures (at a given evaporating temperature) and higher critical temperatures than HFC-245fa and other higher pressure incumbent working fluids (i.e. fluids with lower normal boiling points). Therefore, HFC-245eb and HFC-245eb/Z-HFO-1336mzz blends could enable an existing ORC system to extract heat at higher evaporating temperatures and realize higher energy efficiencies relative to HFC-245fa and other higher pressure fluids without exceeding the maximum permissible working pressure of the equipment or the critical temperature of the working fluid.

The critical temperature of HFC-245fa is 154° C. Table 1 provides the critical temperature ($T_{cr}$) for compositions containing HFC-245eb and Z-HFO-1336mzz. With equipment designed for these high temperatures, it is possible to achieve an evaporator operating temperature at or just below the critical temperatures shown in Table 1.

TABLE 1

| mass fraction Z-HFO-1336mzz (in HFC-245eb/Z-HFO-1336mzz composition) | $T_{cr}$ (° C.) |
|---|---|
| 0.0 | 165.6 |
| 0.1 | 165.6 |
| 0.2 | 165.9 |
| 0.3 | 166.3 |
| 0.4 | 166.8 |
| 0.5 | 167.4 |
| 0.6 | 168.1 |
| 0.7 | 168.9 |
| 0.8 | 169.6 |
| 0.9 | 170.5 |
| 1.0 | 171.3 |

Power Cycle Apparatus

In accordance with this invention, a power cycle apparatus for converting heat to mechanical energy is provided. The apparatus contains a working fluid comprising HFC-245eb and optionally Z-HFO-1336mzz. Typically, the apparatus of this invention includes a heat exchange unit where the working fluid can be heated and an expander where mechanical energy can be generated by expanding the heated working fluid by lowering its pressure. Expanders include turbo or dynamic expanders, such as turbines, and positive displacement expanders, such as screw expanders, scroll expanders, piston expanders and rotary vane expanders. Mechanical power can be used directly (e.g. to drive a compressor) or be converted to electrical power through the use of electrical power generators. Typically the apparatus also includes a working fluid cooling unit (e.g., condenser or heat exchanger) for cooling the expanded working fluid and a compressor for compressing the cooled working fluid.

In one embodiment, the power cycle apparatus comprises a heat exchange unit, an expander, a working fluid cooling unit and a compressor, all of which are in fluid communication in the order listed and through which a working fluid flows from one component to the next in a repeating cycle.

In one embodiment, the power cycle apparatus comprises: (a) a heat exchange unit wherein a working fluid may be heated; (b) an expander in fluid communication with the heat exchange unit, wherein mechanical energy can be generated by expanding the heated working fluid by lowering its pressure; (c) a working fluid cooling unit in fluid communication with the expander for cooling the expanded working fluid; and (d) a compressor in fluid communication with the working fluid cooling unit for compressing the cooled working fluid, the compressor further being in fluid communication with the heat exchange unit such that the working fluid then repeats flow through components (a), (b), (c) and (d) in a repeating cycle. Thus, the power cycle apparatus comprises (a) a heat exchange unit; (b) an expander in fluid communication with the heat exchange unit; (c) a working fluid cooling unit in fluid communication with the expander; and (d) a compressor in fluid communication with the working fluid cooling unit, the compressor further being in fluid communication with the heat exchange unit such that the working fluid then repeats flow through components (a), (b), (c) and (d) in a repeating cycle.

FIG. 1 shows a schematic of one embodiment of the ORC system for using heat from a heat source. Heat supply heat exchanger 40 transfers heat supplied from heat source 46 to the working fluid entering heat supply heat exchanger 40 in liquid phase. Heat supply heat exchanger 40 is in thermal communication with the source of heat (the communication may be by direct contact or another means). In other words, heat supply heat exchanger 40 receives heat energy from heat source 46 by any known means of thermal transfer. The ORC system working fluid circulates through heat supply heat exchanger 40 where it gains heat. At least a portion of the liquid working fluid converts to vapor in heat supply heat exchanger (an evaporator, in some cases) 40.

The working fluid now in vapor form is routed to expander 32 where the expansion process results in conversion of at least a portion of the heat energy supplied from the heat source into mechanical shaft power. The shaft power can be used to do any mechanical work by employing conventional arrangements of belts, pulleys, gears, transmissions or similar devices depending on the desired speed and torque required. In one embodiment, the shaft can also be connected to electric power-generating device 30 such as an induction generator. The electricity produced can be used locally or delivered to a grid.

The working fluid still in vapor form that exits expander 32 continues to condenser 34 where adequate heat rejection causes the fluid to condense to liquid.

It is also desirable to have liquid surge tank 36 located between condenser 34 and pump 38 to ensure there is always an adequate supply of working fluid in liquid form to the pump suction. The working fluid in liquid form flows to pump 38 that elevates the pressure of the fluid so that it can be introduced back into heat supply heat exchanger 40 thus completing the Rankine cycle loop.

Figure 2:
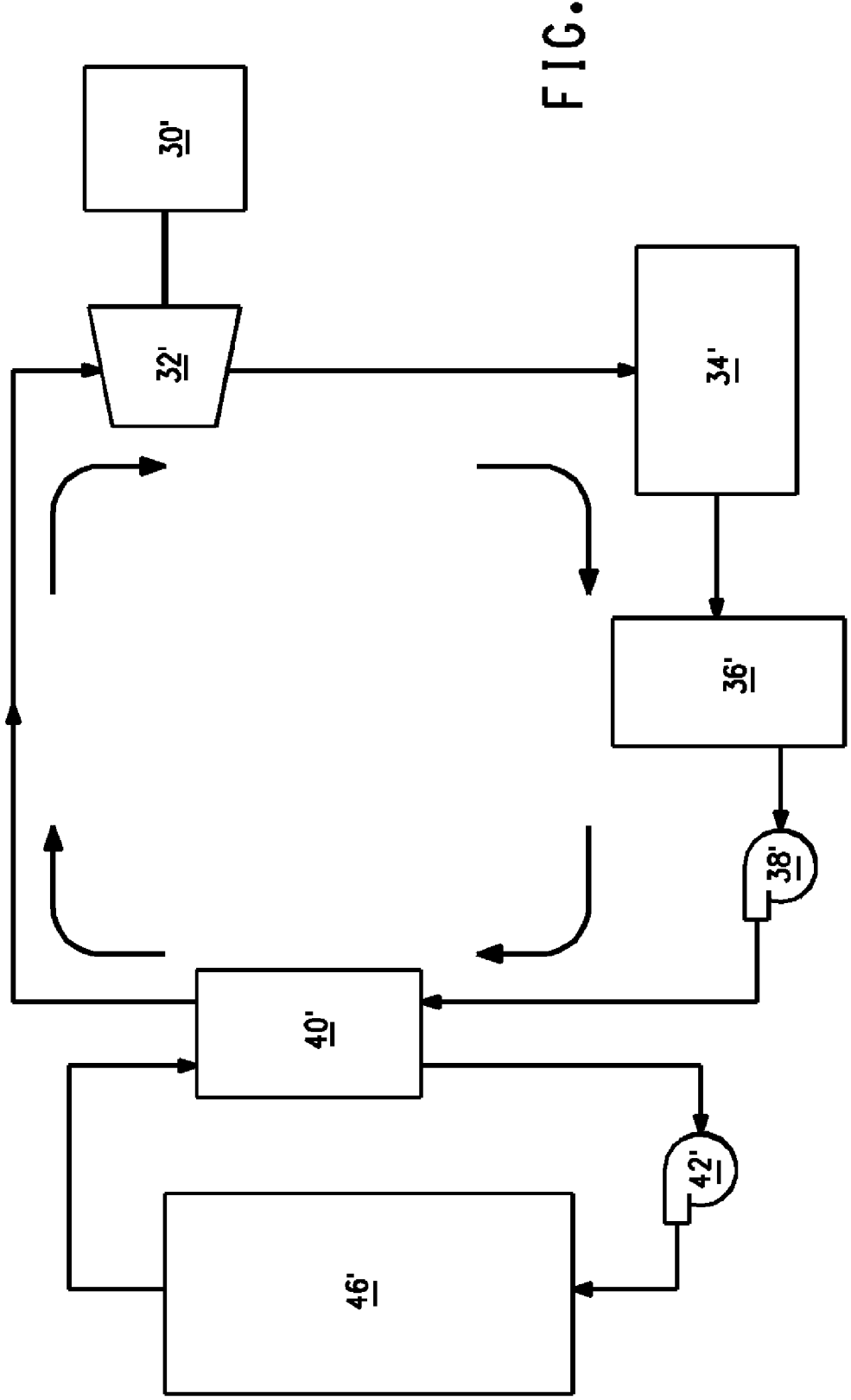
FIG. 2 is a block diagram of a heat source and an organic Rankine cycle system which uses a secondary loop configuration to provide heat from a heat source to a heat exchanger for conversion to mechanical energy according to the present invention.

In an alternative embodiment, a secondary heat exchange loop operating between the heat source and the ORC system can also be used. In FIG. 2, an organic Rankine cycle system is shown, in particular for a system using a secondary heat exchange loop. The main organic Rankine cycle operates as described above for FIG. 1. The secondary heat exchange loop is shown in FIG. 2 as follows: the heat from heat source 46' is transported to heat supply heat exchanger 40' using a heat transfer medium (i.e., secondary heat exchange loop fluid). The heat transfer medium flows from heat supply heat exchanger 40' to pump 42' that pumps the heat transfer medium back to heat source 46'. This arrangement offers another means of removing heat from the heat source and delivering it to the ORC system. This arrangement provides flexibility by facilitating the use of various fluids for sensible heat transfer.

In fact, the working fluids of this invention can be used as secondary heat exchange loop fluids provided the pressure in the loop is maintained at or above the fluid saturation pressure at the temperature of the fluid in the loop. Alternatively, the working fluids of this invention can be used as secondary heat exchange loop fluids or heat carrier fluids to extract heat from heat sources in a mode of operation in which the working fluids are allowed to evaporate during the heat exchange process thereby generating large fluid density differences sufficient to sustain fluid flow (thermosyphon effect). Additionally, high-boiling point fluids such as glycols, brines, silicones, or other essentially non-volatile fluids may be used for sensible heat transfer in the secondary loop arrangement described. A secondary heat exchange loop can make servicing of either the heat source or the ORC system easier since the two systems can be more easily isolated or separated. This approach can simplify the heat exchanger design as compared to the case of having a heat exchanger with a high mass flow/low heat flux portion followed by a high heat flux/low mass flow portion. Organic compounds often have an upper temperature limit above which thermal decomposition will occur. The onset of thermal decomposition relates to the particular structure of the chemical and thus varies for different compounds. In order to access a high-temperature source using direct heat exchange with the working fluid, design considerations for heat flux and mass flow, as mentioned above, may be employed to facilitate heat exchange while maintaining the working fluid below its thermal decomposition onset temperature. Direct heat exchange in such a situation typically requires additional engineering and mechanical features which drive up cost. In such situations, a secondary loop design may facilitate access to the high-temperature heat source by managing temperatures while circumventing the concerns enumerated for the direct heat exchange case.

Other ORC system components for the secondary heat exchange loop embodiment are essentially the same as described for FIG. 1. Liquid pump 42 circulates the secondary fluid (e.g., heat transfer medium) through the secondary loop so that it enters the portion of the loop in heat source 46 where it gains heat. The fluid then passes to heat exchanger 40 where the secondary fluid gives up heat to the ORC working fluid.

In one embodiment of the above process, the evaporator temperature (temperature at which heat is extracted by the working fluid) is less than the critical temperature of the working fluid. Included are embodiments wherein the temperature of operation is any one of the following temperatures or within the range (inclusive) defined by any two numbers below:

about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170 and about 171° C.

In one embodiment of the above process, the evaporator operating pressure is less than about 3.06 MPa. Included are embodiments wherein the pressure of operation is any one of the following pressures or within the range (inclusive) defined by any two numbers below:

about 0.15, 0.2, 0.25, 0.3, 0.35, 0.4, 0.45, 0.5, 0.55, 0.6, 0.65, 0.7, 0.75, 0.8, 0.85, 0.9, 0.95, 1.00, 1.05, 1.10, 1.15, 1.20, 1.25, 1.30, 1.35, 1.40, 1.45, 1.50, 1.55, 1.60, 1.65, 1.70, 1.75, 1.80, 1.85, 1.90, 1.95, 2.00, 2.05, 2.10, 2.15, 2.20, 2.25, 2.30, 2.35, 2.40, 2.45, 2.50, 2.55, 2.60, 2.65, 2.70, 2.75, 2.80, 2.85, 2.90, 2.95, 3.00, 3.05 and about 3.06 MPa.

Use of low cost equipment components substantially expands the practical viability of organic Rankine cycles (see Joost J. Brasz, Bruce P. Biederman and Gwen Holdmann: "Power Production from a Moderate-Temperature Geothermal Resource", GRC Annual Meeting, Sep. 25-28, 2005; Reno, Nev., USA). For example, limiting the maximum evaporating pressure to about 2.2 MPa would allow the use of low-cost equipment components of the type widely used in the HVAC industry.

In one embodiment, compositions useful in the power cycle apparatus may comprise from about 0 to 50 weight percent Z-HFO-1336mzz and from about 100 to 50 weight percent HFC-245eb. In another embodiment, useful compositions consist essentially of from about 0 to 50 weight percent Z-HFO-1336mzz and from about 100 to 50 weight percent HFC-245eb. And in another embodiment, useful compositions consist of from about 0 to 50 weight percent Z-HFO-1336mzz and from about 100 to 50 weight percent HFC-245eb.

In another embodiment, compositions useful in the power cycle apparatus may comprise from about 41 to 50 weight percent Z-HFO-1336mzz and from about 59 to 50 weight percent HFC-245eb. In another embodiment, useful compositions consist essentially of from about 41 to 50 weight percent Z-HFO-1336mzz and from about 59 to 50 weight percent HFC-245eb. And in another embodiment, useful compositions consist of from about 41 to 50 weight percent Z-HFO-1336mzz and from about 59 to 50 weight percent HFC-245eb.

Note that compositions containing more than about 50 weight percent Z-HFO-1336mzz have lower energy efficiency and lower volumetric capacity for power generation than would be desirable for such systems.

The apparatus may include molecular sieves to aid in removal of moisture. Desiccants may comprise activated alumina, silica gel, or zeolite-based molecular sieves. In certain embodiments, the preferred molecular sieves have a pore size of approximately 3 Angstroms, 4 Angstroms, or 5 Angstroms. Representative molecular sieves include MOLSIV XH-7, XH-6, XH-9 and XH-11 (UOP LLC, Des Plaines, Ill.).

Power Cycle Compositions

The compositions comprising HFC-245eb and optionally Z-HFO-1336mzz that are particularly useful in power cycles including organic Rankine cycles are azeotropic or azeotrope-like.

HFC-245eb and Z-HFO-1336mzz for azeotropic and azeotrope-like compositions have been disclosed in U.S. Provisional Patent Application Ser. No. 61/448,241, filed Mar. 2, 2011 (now WO2012/106565A2, published Aug. 9, 2012).

Azeotropic compositions will have zero glide in the heat exchangers, e.g., evaporator and condenser, of a power cycle apparatus.

Of note are compositions HFC-245eb and at least one of Z-HFO-1336mzz and E-HFO-1438mzz that are non-flammable. It has been determined that certain compositions comprising HFC-245eb combined with Z-HFO-1336mzz and/or E-HFO-1438mzz are non-flammable by standard test ASTM 681. Of particular note are compositions containing at least 41 weight percent Z-HFO-1336mzz and HFC-245eb.

Of note are compositions that comprise from about 0 to 41 weight percent Z-HFO-1336mzz and from about 0 to 59 weight percent HFC-245eb. In another embodiment, useful compositions consist essentially of from greater than 0 to about 50 weight percent Z-HFO-1336mzz and from less than 100 to about 50 weight percent HFC-245eb. And in another embodiment, useful compositions consist of from about greater than 0 to about 50 weight percent Z-HFO-1336mzz and from less than 100 to about 50 weight percent HFC-245eb.

Of particular note are compositions that comprise from about 41 to 50 weight percent Z-HFO-1336mzz and from about 59 to 50 weight percent HFC-245eb. In another embodiment, useful compositions consist essentially of from about 41 to 50 weight percent Z-HFO-1336mzz and from about 59 to 50 weight percent HFC-245eb. And in another embodiment, useful compositions consist of from about 41 to 50 weight percent Z-HFO-1336mzz and from about 59 to 50 weight percent HFC-245eb.

In accordance with this invention, a working fluid comprising HFC-245eb and Z-HFO-1336mzz is provided. The working fluid comprises HFC-245eb and Z-HFO-1336mzz and (i) further comprises E-HFO-1336mzz, or (ii) has a temperature above its critical temperature, or both (i) and (ii). Of note are compositions consisting essentially of HFC-245eb and Z-HFO-1336mzz and (i) further comprises E-HFO-1336mzz, or (ii) has a temperature above its critical temperature, or both (i) and (ii).

Also of note are working fluids consisting essentially of HFC-245eb and Z-HFO-1336mzz above its critical temperature and pressure.

Also of note are working fluids wherein the composition has a temperature above the critical temperature of the working fluid and the lubricant is suitable for use at that temperature.

The working fluids comprising HFC-245eb and optionally Z-HFO-1336mzz that also that also include a lubricant may contain a lubricant selected from the group consisting of polyalkylene glycols, polyol esters, polyvinylethers, mineral oils, alkylbenzenes, synthetic paraffins, synthetic naphthenes, and poly(alpha)olefins.

Useful lubricants include those suitable for use with power cycle apparatus. Among these lubricants are those conventionally used in vapor compression refrigeration apparatus utilizing chlorofluorocarbon refrigerants. In one embodiment, lubricants comprise those commonly known as "mineral oils" in the field of compression refrigeration lubrication. Mineral oils comprise paraffins (i.e., straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds). In one embodiment, lubricants comprise those commonly known as "synthetic oils" in the field of compression refrigeration lubrication. Synthetic oils comprise alkylaryls (i.e. linear and branched alkyl alkylbenzenes), synthetic paraffins and naphthenes, and poly(alphaolefins). Representative conventional lubricants are the commercially available BVM 100 N (paraffinic mineral oil sold by BVA Oils), naphthenic mineral oil commercially available from Crompton Co. under the trademarks Suniso® 3GS and Suniso® 5GS, naphthenic mineral oil commercially available from Pennzoil under the trademark Sontex® 372LT, naphthenic mineral oil commercially available from Calumet Lubricants under the trademark Calumet® RO-30, linear alkylbenzenes commercially available from Shrieve Chemicals under the trademarks Zerol® 75, Zerol® 150 and Zerol® 500, and HAB 22 (branched alkylbenzene sold by Nippon Oil).

Useful lubricants may also include those which have been designed for use with hydrofluorocarbon refrigerants and are miscible with working fluids of the present invention under power cycle operating conditions. Such lubricants include, but are not limited to, polyol esters (POEs) such as Castrol® 100 (Castrol, United Kingdom), polyalkylene glycols (PAGs) such as RL-488A from Dow (Dow Chemical, Midland, Mich.), polyvinyl ethers (PVEs), and polycarbonates (PCs).

Lubricants are selected by considering a given compressor's requirements and the environment to which the lubricant will be exposed.

Of note are high temperature lubricants with stability at high temperatures. The highest temperature the power cycle will achieve will determine which lubricants are required.

Of particular note are poly alpha olefin (POA) lubricants with stability up to about 200° C. and polyol ester (POE) lubricants with stability at temperatures up to about 200 to 220° C. Also of particular note are perfluoropolyether lubricants that have stability at temperatures from about 220 to about 350° C. PFPE lubricants include those available from DuPont (Wilmington, Del.) under the trademark Krytox®, such as the XHT series with thermal stability up to about 300 to 350° C. Other PFPE lubricants include those sold under the trademark Demnum™ from Daikin Industries (Japan) with thermal stability up to about 280 to 330° C., and available from Ausimont (Milan, Italy), under the trademarks Fomblin® and Galden® such as that available under the trademark Fomblin®-Y Fomblin®-Z with thermal stability up to about 220 to 260° C.

In another embodiment, a working fluid is provided which comprises HFC-245eb and Z-HFO-1336mzz and further comprises E-HFO-1336mzz. Of note are compositions wherein the total amount of other compounds, including (e.g., E-HFO-1336mzz), is from greater than zero (e.g., 100 parts per million or more) to about 8 weight percent.

Of note are working fluids which comprise or consist essentially of HFC-245eb, Z-HFO-1336mzz and E-HFO-1336mzz (e.g., from 100 ppm to 8 weight percent E-HFO-1336mzz).

Also of note are compositions comprising at least 49.5 weight percent Z-HFO-1336mzz and HFC-245eb, which have GWP less than 150.

A composition is provided for use in a Rankine cycle that converts heat to mechanical energy. The composition comprises a working fluid comprising HFC-245eb and Z-HFO-1336mzz as described above. The composition may be at a temperature above the critical temperature of the working fluid component, particularly when used to generate power within trans-critical or super-critical Rankine cycles as described above. The composition may also comprise at least one lubricant suitable for use at a temperature of at least about 175° C. Of note are compositions comprising at least one lubricant suitable for use at a temperature within the range of from about 175° C. to about 400° C. The compositions of this invention may also include other components such as stabilizers, compatibilizers and tracers.

EXAMPLES

The concepts described herein will be further described in the following examples, which do not limit the scope of the invention described in the claims.

Example 1

Organic Rankine Cycle Using HFC-245eb as the Working Fluid

Table 2 compares the performance of an Organic Rankine Cycle (ORC) using HFC-245eb as the working fluid to that of an ORC using HFC-245fa as the working fluid under the same conditions:

$T_{evap}$=135° C.;
$T_{cond}$=40° C.;
Superheat=10° C.;
Subcooling=10° C.;
Expander Efficiency=0.8;
Compressor (Liquid Pump) Efficiency=0.6.

Table 2 indicates that HFC-245eb, in addition to having a lower GWP than HFC-245fa, enables ORCs with higher energy efficiency than HFC-245fa. Moreover, the evaporating pressure with HFC-245eb is lower than that of HFC-245fa which could be advantageous in allowing equipment with lower maximum permissible working pressure to be used. In some cases HFC-245eb could be used to replace HFC-245fa in existing ORC equipment to reduce the GWP of the working fluid, increase energy efficiency and increase the permissible evaporating temperature.

TABLE 2

Performance of high temperature heat pumps operating with HFC-245eb or HFC-245fa as the working fluid.

|  |  | HFC-245fa | HFC-245eb |
|---|---|---|---|
| $GWP_{100}$ |  | 1,030 | 286 |
| $P_{evap}$ | MPa | 2.58 | 2.18 |
| $P_{cond}$ | MPa | 0.25 | 0.19 |
| Energy Efficiency |  | 0.1232 | 0.1300 |
| Volumetric Capacity for Power Generation | kJ/m³ | 400.49 | 335.97 |

Example 2

Organic Rankine Cycles Using HFC-245eb/Z-HFO-1336mzz Blends as the Working Fluid Table 3 compares the performance of Organic Rankine Cycles (ORCs) using non-flammable Blend A (Z-HFO-1336mzz/HFC-245eb 41/59 wt %) or non-flammable Blend B (Z-HFO-1336mzz/HFC-245eb 50/50 wt %) as the working fluid to the performance of an ORC using HFC-245fa as the working fluid under the same conditions:

$T_{evap}$=135° C.;
$T_{cond}$=40° C.;
Superheat=10° C.;
Subcooling=10° C.;
Expander Efficiency=0.8;
Compressor (Liquid Pump) Efficiency=0.6.

Table 3 indicates that Blends A and B, in addition to having lower GWP values than HFC-245fa, enable ORCs with somewhat higher energy efficiency than HFC-245fa. Moreover, the evaporating pressures with Blends A and B are substantially lower than the evaporating pressure with HFC-245fa, which could be advantageous in allowing equipment with lower maximum permissible working pressure to be used. In some cases, Blend A or Blend B could be used to replace HFC-245fa (or CFC-114) in existing ORC equipment to reduce the GWP of the working fluid, allow higher evaporating temperatures (without exceeding the maximum permissible working pressure of the equipment or the critical temperature of the working fluid) and realize higher energy efficiency. Blend C shows greater loss in capacity than would be desired for such systems.

TABLE 3

Performance of high temperature heat pumps operating with HFC-245eb or HFC-245fa as the working fluid.

|  |  | HFC-245fa | A Z-HFO-1336mzz/ HFC-245eb (41/59 wt %) | B Z-HFO-1336mzz/ HFC-245eb (50/50 wt %) | C Z-HFO-1336mzz/ HFC-245eb (75/25 wt %) |
|---|---|---|---|---|---|
| $GWP_{100}$ |  | 1,030 | 173 | 148 | 79 |
| $P_{evap}$ | MPa | 2.58 | 1.93 | 1.87 | 1.69 |
| $P_{cond}$ | MPa | 0.25 | 0.17 | 0.17 | 0.15 |
| Energy Efficiency |  | 0.1232 | 0.1274 | 0.1268 | 0.1254 |
| Volumetric Capacity for Power Generation | kJ/m³ | 400.49 | 298.35 | 288.70 | 259.84 |

What is claimed is:

1. A method for converting heat from a heat source to mechanical energy, comprising:
    heating a working fluid comprising from about 41 to 50 weight percent Z-HFO-1336mzz and from about 59 to 50 weight percent HFC-245eb using heat supplied from the heat source; and
    expanding the heated working fluid to lower the pressure of the working fluid and generate mechanical energy as the pressure of the working fluid is lowered.

2. The method of claim 1, wherein the working fluid is compressed prior to heating; and the expanded working fluid is cooled and compressed for repeated cycles.

3. The method of claim 2 wherein heat from a heat source is converted to mechanical energy using a sub-critical cycle comprising:
    (a) compressing a liquid working fluid to a pressure below its critical pressure;
    (b) heating the compressed liquid working fluid from (a) using heat supplied by the heat source to form vapor working fluid;
    (c) expanding the vapor working fluid from (b) to lower the pressure of the working fluid and generate mechanical energy;
    (d) cooling the expanded working fluid from (c) to form a cooled liquid working fluid; and
    (e) cycling the cooled liquid working fluid from (d) to (a) for compression.

4. The method of claim 2 wherein heat from a heat source is converted to mechanical energy using a trans-critical cycle comprising:
   (a) compressing a liquid working fluid above said working fluid's critical pressure;
   (b) heating the compressed working fluid from (a) using heat supplied by the heat source;
   (c) expanding the heated working fluid from (b) to lower the pressure of the working fluid below its critical pressure and generate mechanical energy;
   (d) cooling the expanded working fluid from (c) to form a cooled liquid working fluid; and
   (e) cycling the cooled liquid working fluid from (d) to (a) for compression.

5. The method of claim 2 wherein heat from a heat source is converted to mechanical energy using a super-critical cycle comprising:
   (a) compressing a working fluid from a pressure above its critical pressure to a higher pressure;
   (b) heating the compressed working fluid from (a) using heat supplied by the heat source;
   (c) expanding the heated working fluid from (b) to lower the pressure of the working fluid to a pressure above its critical pressure and generate mechanical energy;
   (d) cooling the expanded working fluid from (c) to form a cooled working fluid above its critical pressure; and
   (e) cycling the cooled liquid working fluid from (d) to (a) for compression.

6. The method of claim 1 wherein the working fluid is a non-flammable composition consisting essentially of HFC-245eb and Z-HFO-1336mzz.

7. A power cycle apparatus containing a working fluid to convert heat to mechanical energy, characterized by:
   said apparatus containing a working fluid comprising from about 41 to 50 weight percent Z-HFO-1336mzz and from about 59 to 50 weight percent HFC-245eb.

8. The power cycle apparatus of claim 7 comprising (a) a heat exchange unit; (b) an expander in fluid communication with the heat exchange unit; (c) a working fluid cooling unit in fluid communication with the expander; and (d) a compressor in fluid communication with the working fluid cooling unit, the compressor further being in fluid communication with the heat exchange unit such that the working fluid then repeats flow through components (a), (b), (c) and (d) in a repeating cycle.

9. A working fluid comprising from about 41 to 50 weight percent Z-HFO-1336mzz and from about 59 to 50 weight percent HFC-245eb, which, optionally (i) further comprises E-HFO-1336mzz, or (ii) has a temperature above its critical temperature, or both (i) and (ii).

10. The working fluid of claim 9 consisting essentially of HFC-245eb and Z-HFO-1336mzz above its critical temperature and pressure.

11. A composition suitable for use in organic Rankine apparatus, comprising a working fluid of claim 9 and a lubricant.

12. The composition of claim 11 wherein the working fluid component of the composition consists essentially of HFC-245eb and Z-HFO-1336mzz.

13. The composition of claim 11 wherein the composition has a temperature above the critical temperature of the working fluid and the lubricant is suitable for use at said temperature.

14. A method for raising the maximum feasible evaporating temperature of an existing Rankine cycle system containing a first working fluid comprising:
   replacing the first working fluid with a second working fluid comprising from about 41 to 50 weight percent Z-HFO-1336mzz and from about 59 to 50 weight percent HFC-245eb.

* * * * *